United States Patent [19]

Kelch et al.

[11] Patent Number: 5,712,031
[45] Date of Patent: Jan. 27, 1998

US005712031A

[54] PLASTIC ADHESIVE LABELS FOR GLASS SUBSTRATES

[75] Inventors: Robert H. Kelch, Granville; Harvey C. Tung, Newark, both of Ohio

[73] Assignee: The Dow Chemical Company, Midland, Mich.

[21] Appl. No.: 610,560

[22] Filed: Mar. 6, 1996

[51] Int. Cl.$^6$ ........................................ B32B 7/12
[52] U.S. Cl. ........................ 428/355; 428/195; 428/337; 428/343; 428/411.1; 428/500; 428/522
[58] Field of Search ........................ 428/500, 411.1, 428/195, 355 R, 913, 914, 355, 337, 343, 522

[56] References Cited

U.S. PATENT DOCUMENTS

| | | |
|---|---|---|
| Re. 32,929 | 5/1989 | Ewing . |
| 3,604,584 | 9/1971 | Shank . |
| 3,657,043 | 4/1972 | Ploetz et al. . |
| 3,663,334 | 5/1972 | Mueller-Tamm et al. . |
| 3,853,693 | 12/1974 | Priddle et al. . |
| 3,857,803 | 12/1974 | Borden . |
| 3,922,435 | 11/1975 | Asnes . |
| 3,952,135 | 4/1976 | Priddle et al. . |
| 4,027,426 | 6/1977 | Wallding et al. . |
| 4,204,029 | 5/1980 | Batchelor et al. . |
| 4,225,049 | 9/1980 | Inoue . |
| 4,314,929 | 2/1982 | Mahoney, Jr. . |
| 4,569,879 | 2/1986 | Groves . |
| 4,608,284 | 8/1986 | Roales . |
| 4,675,351 | 6/1987 | Borden . |
| 4,724,029 | 2/1988 | Batchelor et al. . |
| 4,749,739 | 6/1988 | Foster et al. . |
| 4,781,785 | 11/1988 | Szeremeta . |
| 4,880,683 | 11/1989 | Stow . |
| 4,888,391 | 12/1989 | Domine et al. . |
| 4,941,935 | 7/1990 | Gregory . |
| 4,983,436 | 1/1991 | Bailey et al. . |
| 4,986,866 | 1/1991 | Ohba et al. . |
| 5,075,152 | 12/1991 | Tsukuda et al. . |
| 5,091,239 | 2/1992 | Przeworski et al. . |
| 5,126,197 | 6/1992 | Schinkel et al. . |
| 5,242,650 | 9/1993 | Rackovan et al. . |
| 5,252,393 | 10/1993 | Kagota et al. . |
| 5,284,688 | 2/1994 | Hiatt . |
| 5,366,251 | 11/1994 | Brandt et al. . |
| 5,435,963 | 7/1995 | Rackovan et al. . |
| 5,460,878 | 10/1995 | Hostetter . |
| 5,480,700 | 1/1996 | Kume et al. . |

FOREIGN PATENT DOCUMENTS

| | | |
|---|---|---|
| 536673-A2 | 10/1991 | European Pat. Off. . |
| 2607326 | 9/1976 | Germany . |
| 222612 | 5/1985 | Germany . |
| 3910651 | 10/1990 | Germany . |
| 2103-128-A | 10/1985 | Japan . |
| 06023890-A | 3/1992 | Japan . |
| 06027885-A | 3/1992 | Japan . |
| 05309732-A | 5/1992 | Japan . |
| 06238752-A | 2/1993 | Japan . |
| 06270250-A | 3/1993 | Japan . |
| 1372251 | 4/1971 | United Kingdom . |
| 1418948 | 7/1973 | United Kingdom . |
| 1534001 | 11/1978 | United Kingdom . |
| 2197326 | 2/1990 | United Kingdom . |
| 9424220 | 10/1994 | WIPO . |

*Primary Examiner*—William Krynski
*Attorney, Agent, or Firm*—Stanley K. Hill

[57] ABSTRACT

A multilayer film useful for making plastic adhesive labels for glass substrates such as glass bottles. The multilayer films contain a base layer, an adhesive layer, and optionally an intermediate layer to improve interlayer bonding between the base layer and the adhesive layer. The adhesive layer comprises a terpolymer of ethylene, 3–10 weight percent of an ethylenically unsaturated carboxylic acid (e.g. acrylic acid or methyacrylic acid), and 3–25 weight percent of an unsaturated ester (e.g., methyl, ethyl, or n-butyl acrylate or methacrylate). The base layer preferably comprises oriented polypropylene or oriented polyester, but may also comprise high density polyethylene or PETG. The multilayer film can be utilized in conventional graphics printing operations and do not require the use of a separate release liner. Labels made from films of the present invention exhibit sufficient adhesion to glass substrates to withstand washing/rinsing, filling, and pasteurization processes utilized in the bottling industry.

14 Claims, No Drawings

PLASTIC ADHESIVE LABELS FOR GLASS SUBSTRATES

This invention relates to plastic adhesive labels for glass substrates and plastic adhesive films suitable for making such labels. More specifically the present invention relates to plastic adhesive labels that can be applied to glass bottles prior to the filling of the bottles and which will survive rinsing, filling, and pasteurization operations as well as consumer end-use applications (e.g. immersion in an ice chest).

Currently, most glass beverage bottles are labeled with paper labels. These paper labels can not withstand the filling and pasteurization processes that the bottles must go through. Thus, to avoid damage to the paper labels, the paper labels are applied to a bottle after the bottle has been rinsed, filled, and pasteurized (i.e., "post-applied"). Generally, printed paper labels are post-applied to filled bottles using aqueous adhesives or hot melt adhesives.

If post-applied paper labels are not completely adhered to the bottle, are misaligned on the bottle, or are otherwise incorrectly applied to the filled bottle, then the entire bottle and contents will be unusable and must be discarded. Thus, it is desired that glass bottles be labeled and inspected prior to being filled and pasteurized to eliminate defective bottles or labels.

It is known in the art to use certain high performance acrylic pressure sensitive adhesives to pre-apply plastic labels to glass bottles following bottle formation at a bottle manufacturing plant. Examples include Optiflex labels (available from Flexcon), Clear Advantage labels (available from Avery), and Primeline label films (available from Polykote Corporation). These labels can generally withstand the bottle washing/rinsing, filling, and pasteurization operations at a bottle filling plant. Thus, these labels have overcome some of the deficiencies of a post-applied label.

However, the high performance acrylic pressure sensitive adhesives are costly and also require the use of a costly silicone release liner. Labels made using high performance acrylic adhesives generally cost 3–5 times as much as paper labels. This increased cost inhibits widespread market acceptance. Additionally, following labeling the silicone release liner must be disposed of, creating a waste issue for the bottle labeler.

SUMMARY OF THE INVENTION

The present invention provides a multilayer film containing a heat-activated adhesive layer which will adhere to glass and provide a water and moisture resistant bond to the glass substrate. The adhesive layer is not tacky and films of the present invention do not exhibit significant blocking at room temperature. Thus, films of the present invention do not need to be used in conjunction with a separate release liner or film (e.g., a silicone release liner).

The multilayer film comprises a base layer of oriented polypropylene, oriented polyester, high density polyethylene, or glycol-modified copolyester ("PETG"). The adhesive layer consists essentially of a terpolymer of ethylene, 3–10 weight percent of an ethylenically unsaturated carboxylic acid, and 3–25 weight percent of an unsaturated ester.

In another embodiment of the present invention, multilayer films of the present invention can be printed on and cut into adhesive labels for adhering to glass containers. Adhesive labels of the present invention can be laminated with pressure to glass bottles which have been pre-heated to temperatures of at least about 200° F. Labels of the present invention exhibit dry adhesion peel strengths of at least about 750 grams/inch and wet adhesion peel strengths of at least about 450 grams/inch.

DETAILED DESCRIPTION OF THE INVENTION

Films of the present invention can be made into adhesive labels that can be adhered to glass bottles prior to washing/rinsing, filling, and pasteurization processes. The techniques that can be utilized to make films of the present invention into labels is well known in the art. Before labels of the present invention are applied to an empty glass bottle, the bottle is pre-heated to a temperature of at least 200° F. and preferably about 250° F. A pasteurization process typically consists of spraying hot water at a temperature of 150°–180° F. onto the glass bottles for about 30–60 minutes.

Films of the present invention generally comprise a base layer and an adhesive layer, although it is within the scope of the present invention to use an intermediate layer between the base layer and the adhesive layer to improve interlayer bonding of the adhesive layer to the base layer. Generally, the base layer is at least about 0.4 mils thick and preferably at least about 0.5 mils thick. The base layer is no thicker than about 3.0 mils and preferably no thicker than about 1.5 mils. Generally, the adhesive layer is at least about 0.3 mils thick and preferably at least about 0.5 mils thick. The adhesive layer is no thicker than about 1.5 mils and preferably no thicker than about 1.0 mils.

The composition of both the base and adhesive layers are chosen so that the resulting film meets two requirements. First, the film must exhibit sufficient tensile strength, modulus, tear resistance and flatness to allow it to handle well through a graphics printing operation. The graphics printing operations utilized in making labels of the present invention are known in the art and may include, for example, flat screen printing, rotary screen printing, flexographic, and rotographic processes. Second, the resulting labels must exhibit sufficient adhesion to glass substrates.

Labels of the present invention must have sufficient "dry adhesion." Dry adhesion refers to the level of adhesion to glass observed when applied film or labels are not in the presence of moisture. This occurs both before and after any washing/rinsing, filling, and pasteurization processes. Labels of the present invention must also exhibit sufficient "wet adhesion." Wet adhesion refers to the level of adhesion to glass observed after applied film or labels have been exposed to moisture. This exposure to moisture occurs during the washing/rinsing, filling, and pasteurization processes.

Unless stated otherwise, adhesion levels disclosed in the present application were measured using a peel test method based on ASTM D-903 "Peel or Stripping Strength of Adhesive Bonds" ("adhesion peel test"). In this adhesion peel test, sample films (i.e., labels) are first adhered to glass bottles. Next, a 1 inch wide strip of film is cut and peeled from around the circumference of the bottle at a rate of 12 inches/minute. The bottle is rotated as the peel test occurs such that the film sample maintains a 180 degree or tangential geometry to the bottle surface. Peel data is recorded in grams/inch.

Dry adhesion levels were measured after labeled bottles had aged or conditioned in an ASTM lab at 50% relative humidity and 23° C. (73° F.) for at least 24 hours. Wet adhesion levels were measured after labeled bottles had been immersed in 23° C. (73° F.) water for 1 hour. The bottles were pulled from the water and immediately the 1 inch wide strips were cut and the adhesion peel test conducted on the wet bottles.

Films and labels of the present invention exhibit dry adhesion values of at least about 750 grams/inch, and preferably at least about 900 grams/inch. Preferably, films and labels of the present invention exhibit wet adhesion levels of at least about 450 grams/inch.

Preferably, the base layer in films and labels of the present invention is made of oriented polypropylene ("OPP") or oriented polyester ("OPET"). However, base layers made of high density polyethylene ("HDPE") or PETG may also be utilized in some embodiments of the present invention. Base layers of OPP and OPET are generally preferred due to their low cost, optical clarity, and high modulus or stiffness.

The optical clarity of OPP and OPET films allow them to be used for making clear or "no look" labels. For making clear labels, the base layer will preferable have a 45° gloss of at least 80% as measured via ASTM D-2457 and a maximum haze of 9%, preferably a maximum haze of 5% as measured via ASTM D-1003.

Suitable base layer films will generally have a 1% secant modulus of at least 200,000 psi and preferably at least 250,000 psi as measure via ASTM D-882. Additionally, to minimize water permeation through the film to the adhesive/ glass interface, the base layer should exhibit a water vapor transmission rate ("WVTR") of less than about 3.0 g-mil/ 100 in 2-24 hr and preferably less than about 1.5 g-mil/100 in 2-24 hr as measured via ASTM F-1249. Unless stated otherwise, all WVTR values disclosed in this specification will be measure via ASTM F-1249.

Additives may be included in the base layer as long as the amount of additive does not interfere with the film's ability to be printed and cut into labels and does not interfere with the needed adhesion levels to glass substrates. The amounts and types of additives that can be included in the base layer are generally known in the art or can be determined without undue experimentation. For example, if clear labels are not desired, pigments can be added to the base layer to provide color to the resulting labels.

The adhesive layer in films and labels of the present invention consists essentially of a terpolymer of ethylene, 3–10 weight percent of an ethylenically unsaturated carboxylic acid (e.g., acrylic acid or methyacrylic acid), and 3–25 weight percent of an unsaturated ester (e.g., methyl, ethyl or n-butyl acrylate or methacrylate). An especially preferred adhesive is a terpolymer of ethylene, 4–8 weight percent acrylic acid, and 15–20 weight percent methyl acrylate.

In order to exhibit adequate adhesion to glass at temperatures of about 250° F. (preferred bottle temperature when labels are applied) and yet survive bottle pasteurization of temperatures up to 180° F., the adhesive should have a melting point between 150° F. and 200° F. (65° C. and 93° C.). The adhesive should have a melt index of at least 2 grams/10 minutes at 190° C., and preferably at least 5 grams/10 minutes as measured via ASTM D-1238, condition E. Additionally, the adhesive should exhibit a 125° C. melt flow rate of at least 0.2 grams/10 minutes and preferably at least 0.5 grams/10 minutes as measured via ASTM D-1238, condition B. Unless stated otherwise, all melt index values disclosed in the specification will have been measured using ASTM D-1238, condition E, and all melt flow rate values will have been measured using ASTM D-1238, condition B.

Adhesives useful in the present invention have a density of 0.91–0.97 g/cc. Adhesives used in the present invention exhibit a water vapor transmission rate of 3.5–20 g-mil/100 in 2-24 hours. Adhesives used in the present invention also absorb water of 0.2 to 0.45 weight percent based on the initial dry film weight after the film has soaked in 72° F. water for 4 days. Unless stated otherwise, all water absorption values disclosed in this specification were measured in this same manner.

Additives may also be included in the adhesive layer as long as the amount of additive does not interfere with the film's ability to be printed and cut into labels and does not interfere with the needed adhesion levels to glass substrates. The amounts and types of additives that can be included in the adhesive layer are also generally known in the art or can be determined without undue experimentation. Potentially useful additives include antiblock agents such as $SiO_2$, slip agents such as stearamide or erucylamide, antioxidants, ultraviolet light stabilizers, and tackifiers. Also, if clear labels are not desired, pigments can be added to the adhesive layer to provide color to the resulting labels.

An intermediate layer may be used between the base layer and the adhesive layer to improve interlayer bonding between the base layer and the adhesive layer. Such an intermediate layer can be advantageously coextruded with the adhesive layer. One such useful intermediate layer comprises a copolymer of ethylene vinyl acetate.

When the label is applied to a glass substrate such as a glass bottle, the adhesive must flow and wet-out onto the surface of the heated glass substrate so as to eliminate air bubbles or voids between the label and the surface of the glass. Also, embossing a slight texture or matte surface texture onto the adhesive layer can improve air bubble removal, improving wet-out onto the glass during thermal lamination to the glass substrate (e.g., glass bottle).

Multilayer films of the present invention can be produced by techniques known in the art. For example, the films can be produced via simultaneous coextrusion of the base layer and the adhesive layer, extrusion coating of the adhesive onto a base film, or liquid coating of a solvent or aqueous dispersion of a thermoplastic adhesive onto a base film.

When extrusion or liquid coating techniques are utilized, the base film to be coated can be pretreated. Pretreatment can include corona treatment, flame treatment, silane coating, acrylic coatings, polyvinylidene chloride ("PVDC") coatings, and the like. These pretreatments may improve the wetting out of other coatings such as a coating of printing ink or the coating of adhesive.

EXAMPLES

Unless stated otherwise, percentages in the following examples are based on weight percent.

Example 1

An oriented polyester ("OPET") film was extrusion coated with an adhesive resin to form a two-layer film sample. The OPET film was a 0.75 mil PVDC-coated OPET film (Mylar M34 available from DuPont). The adhesive resin was a terpolymer comprising ethylene, 18% methyl acrylate, and 6% acrylic acid having a melt index of 5 g/10 minutes and a melt flow rate of 0.4 grams/10 minutes (Escor ATX-320 available from Exxon) with 0.75% silicon dioxide ("$SiO_2$") added as an antiblock agent via a 5 phr blend of a 15% $SiO_2$ in a low density polyethylene ("LDPE") concentrate. The adhesive also exhibited a water absorption value of 0.33 weight percent. The adhesive was extrusion coated at 425° F. through a conventional slot die onto the PVDC-coated OPET film. The adhesive and OPET film were joined together at a chilled casting roll with a rubber back-up roll forming a nip pressure point on the extrusion coating process. The adhesive coating was 1.0 mils thick, yielding a total film sample thickness of 1.75 mils.

The film sample exhibited a WVTR of 0.6 g-mil/100 in 2–24 hrs as measured via ASTM F-1249. The film sample was wound up into a roll and in a separate step the exposed polyester side of the film sample was multicolor printed using a conventional multistation flat screen press and UV curable acrylic-based inks.

The printed film sample was then cut into 3 inch by 3 inch "labels" and thermally laminated to 12 ounce amber long-neck glass bottles which were preheated to 250° F. The labels were applied using pressure with the adhesive layer contacting the heated glass surface.

Adhesion levels were tested using the above-described adhesion peel test. The label samples exhibited a dry adhesion peel strength of 1665 g/inch and a wet adhesion peel strength of 1350 g/inch.

Example 2

A film sample was prepared in the same manner as Example 1. However, 0.8 mil of the Escor ATX-320 adhesive was extrusion coated onto a 0.5 mil OPET film (Melinex 813 available from ICI). Prior to the extrusion coating the OPET film had been subjected to a corona treatment. Also, a matte embossed finish casting roll was used to impart a matte surface roughness to the adhesive layer.

The film sample was tested for adhesion levels in the same manner as the film sample of Example 1. The label samples exhibited a dry adhesion peel strength of 1600 g/inch and a wet adhesion peel strength of 1200 g/inch.

Example 3

A film sample was prepared in the same manner as Example 1. However, 1.0 mil of the Escor ATX-320 adhesive was extrusion coated onto the treated propylene copolymer heatseal layer of a 1.0 mil coextruded, oriented polypropylene film (AA25 available from Amtopp). The 2.0 mil film sample exhibited a WVTR of 0.25 g-mil/100 in 2–24 hrs.

The film sample was tested for adhesion levels in the same manner as the film sample of Example 1. The label samples exhibited a dry adhesion peel strength of 1585 g/inch and a wet adhesion peel strength of 1250 g/inch.

Example 4

A film sample was prepared in the same manner as Example 1. The adhesive used was a terpolymer comprising ethylene, 20% methyl acrylate, and 6% acrylic acid having a melt index of 20 g/10 minutes and a melt flow rate of 1.6 g/10 minutes (Escor ATX-325 available from Exxon). The adhesive also exhibited a water absorptin value of 0.32 weight percent. The adhesive was extruded onto a 0.5 mil PVDC-coated OPET film (Mylar M34 available from DuPont).

The film sample was tested for adhesion levels in the same manner as the film sample of Example 1. The label samples exhibited a dry adhesion peel strength of 1335 g/inch and a wet adhesion peel strength of 1165 g/inch.

Example 5

A film sample was prepared in the same manner as Example 1. The adhesive used was a blend of 80% Escor ATX-325 (available from Exxon) and 20% of a cycloaliphatic hydrocarbon tackifier resin (Escorez 5320 available from Exxon). The adhesive resin was blended with a 15% SiO2 concentrate in LDPE. The total SiO2 content of the adhesive layer was 0.75%. The adhesive was extrusion coated onto the PVDC-coated side of a PVDC-coated OPET film (Mylar M34 available from DuPont).

The film sample was tested for adhesion levels in the same manner as the film sample of Example 1. The label samples exhibited a dry adhesion peel strength of 1335 g/inch and a wet adhesion peel strength of 1165 g/inch.

Example 6

A conventional multilayer cast film line was used to coextrude a two layer film. The first layer was 1.0 mil and comprised a PETG resin (Kodar 6763, available from Eastman) extruded at a temperature of 420° F. The second layer was 1.0 mil and comprised Escor ATX 320 (available from Exxon) with 5 phr of a 15% SiO2 concentrate in LDPE extruded at a temperature of 400° F. The film was cast onto a smooth casting roll cooled to 100° F. prior to winding. The 2.0 mil coextruded film exhibited a WVTR of 2.1 g-mil/100 in 2–24 hrs.

The film sample was tested for adhesion levels in the same manner as the film sample of Example 1. The label samples exhibited a dry adhesion peel strength of 1920 g/inch and a wet adhesion peel strength of 1415 g/inch.

Example 7

A two layer coextruded film was produced in the same manner as Example 6 except that a polyethylene blend was used instead of the PETG resin. In the polyethylene blend, 80% high density polyethylene (HDPE 05862N, available from The Dow Chemical Company) having a melt index of 5.0 and a density of 0.962 g/cc was blended with 20% low density polyethylene (LDPE 5351, available from The Dow Chemical Company) having a melt index of 1.9 and a density of 0.925 g/cc. The blend was extruded at a temperature of 420° F. The resulting film exhibited a WVTR of 0.5 g-mil/100 in 2–24 hrs.

The film sample was tested for adhesion levels in the same manner as the film sample of Example 1. The label samples exhibited a dry adhesion peel strength of 1460 g/inch and a wet adhesion peel strength of 1375 g/inch.

What is claimed is:

1. A multilayer film, comprising:
   i) an ink-printable base layer having a 1% secant modulus of at least 200,000 psi as measured by ASTM D-882, said base layer having a water vapor transmission rate of less than about 3.0 g-mil/100 in$^2$-24 hr as measured by ASTM F-1249;
   ii) an optional intermediate layer for improving interlayer bonding between said base layer and said adhesive layer; said intermediate layer, when present, is bonded directly to said base layer; and
   iii) an adhesive layer, said adhesive layer consisting essentially of a terpolymer of ethylene, 3–10 weight percent of an ethylenically unsaturated carboxylic acid, and 3–25 weight percent of an unsaturated ester, said adhesive layer bonded directly to said intermediate layer when said intermediate layer is present, said adhesive layer bonded directly to said base layer when said intermediate layer is not present, said adhesive layer being sufficiently nontacky at room temperature such that the multilayer film does not exhibit significant blocking at room temperature, wherein the multilayer film, upon contacting said adhesive layer to a glass substrate heated to at least about 200° F. and thereafter cooling, exhibits a dry adhesion peel strength of at least about 750 grams/inch and a wet adhesion peel strength of at least about 450 grams/inch.

2. A multilayer film according to claim 1, wherein the thickness of said base layer is between about 0.4 mils and 3.0 mils.

3. A multilayer film according to claim 1, wherein the thickness of said adhesive layer is between about 0.3 mils and 1.5 mils.

4. A multilayer film according to claim 1, wherein said adhesive layer consists essentially of an adhesive having a melting point between 150° F. (65° C.) and 200° F. (93° C.).

5. A multilayer film according to claim 1, wherein said adhesive layer consists essentially of an adhesive having a melt index of at least 2 grams/10 minutes at 190° C.

6. A multilayer film according to claim 1, wherein said adhesive layer consists essentially of an adhesive having a 125° C. melt flow rate of at least 0.2 grams/10 minutes.

7. A multilayer film according to claim 1, wherein said adhesive layer consists essentially of a terpolymer of ethylene, 4–8 weight percent acrylic acid, and 15–20 weight percent methyl acrylate.

8. A multilayer film according to claim 1, wherein said base layer consists essentially of oriented polypropylene, oriented polyester, high density polyethylene, or glycol-modified copolyester.

9. A multilayer film according to claim 1, wherein said base layer consists essentially of oriented polypropylene or oriented polyester.

10. A multilayer film according to claim 1, wherein said base layer has a 45° gloss of at least 80%.

11. A multilayer film according to claim 1, wherein said base layer has a maximum haze of 9%.

12. A multilayer film according to claim 1, wherein said base layer has a water vapor transmission rate of less than about 1.5 g-mil/100 in$^2$-24 hr as measured by ASTM F-1249.

13. A multilayer film according to claim 1, wherein said intermediate layer consists essentially of a copolymer of ethylene and vinyl acetate.

14. A multilayer film according to claim 1, wherein the film exhibits a dry adhesion peel strength of at least about 900 grams/inch.

\* \* \* \* \*